United States Patent [19]

Shimada et al.

[11] Patent Number: 4,916,693
[45] Date of Patent: Apr. 10, 1990

[54] DIGITAL TIME DIVISION MULTIPLEX SYSTEM AND METHOD OF CONTROLLING SAME

[75] Inventors: Masayoshi Shimada, Amagasaki; Kazuyoshi Ohshima, Kamakura, both of Japan

[73] Assignee: Mitsubishi Denki Kabushiki Kaisha, Japan

[21] Appl. No.: 153,291

[22] Filed: Feb. 4, 1988

[30] Foreign Application Priority Data

| May 15, 1987 | [JP] | Japan | 62-119239 |
| Jun. 18, 1987 | [JP] | Japan | 62-151732 |
| Jun. 18, 1987 | [JP] | Japan | 62-151733 |

[51] Int. Cl.$^4$ .................................. H04J 3/22
[52] U.S. Cl. ................................. 370/84; 370/110.1
[58] Field of Search .............. 370/84, 85, 58, 67, 370/99, 110.1; 340/825.5

[56] References Cited

U.S. PATENT DOCUMENTS

| 4,477,898 | 10/1984 | Cholat-Namy | 370/84 |
| 4,481,626 | 11/1984 | Boggs et al. | 370/85 |
| 4,698,801 | 10/1987 | Hatano et al. | 370/84 |
| 4,764,921 | 8/1988 | Graves et al. | 370/110.1 |

FOREIGN PATENT DOCUMENTS 61-163741 1/1985 Japan .
61-236232 4/1985 Japan .

OTHER PUBLICATIONS

"The Present Condition of Time Division Multiplexer," Jul. '86, Nikkei Datapro-Datacomm., Nikkei McGraw Hill.

Primary Examiner—Joseph A. Orsino
Assistant Examiner—Frank M. Scutch, III
Attorney, Agent, or Firm—Townsend & Townsend

[57] ABSTRACT

A time division multiplex system adaptable for branching services, which includes a predetermined level code generator for generating a signal of the same level and a switching unit for switching between the predetermined level signal and a signal to be multiplexed. The channel bit group number allotted to each channel is changed with time. For signals of transmission speeds above 64 Kb/s, a plurality of time slots are used to form a single channel to thereby accommodate branching services in octet units.

17 Claims, 20 Drawing Sheets

FIG. 2

| | CHANNEL BIT GROUP NO. / STATION | M1 | M2 | M3 | M4 |
|---|---|---|---|---|---|
| SENDING CONTROL SIGNAL 109 | 1 | 0 | 0 | 1 | 1 |
| | 2 | 0 | 1 | 0 | 1 |
| | 3 | 0 | 1 | 1 | 0 |
| | 4 | 1 | 0 | 0 | 1 |
| | 5 | 1 | 0 | 1 | 0 |
| | 6 | 1 | 1 | 0 | 0 |
| RECEIVING CONTROL SIGNAL 110 | 1 | 0 | 0 | 1 | 1 |
| | 2 | 0 | 1 | 0 | 1 |
| | 3 | 0 | 1 | 1 | 0 |
| | 4 | 1 | 0 | 0 | 1 |
| | 5 | 1 | 0 | 1 | 0 |
| | 6 | 1 | 1 | 0 | 0 |

FIG. 4(a)

| CHANNEL BIT GROUP NO. STATION TIME PATTERN | | T0 | | | | T1 | | | | T2 | | | | T3 | | | |
|---|---|---|---|---|---|---|---|---|---|---|---|---|---|---|---|---|---|
| | | M1 | M2 | M3 | M4 | M1 | M2 | M3 | M4 | M1 | M2 | M3 | M4 | M1 | M2 | M3 | M4 |
| (1) SENDING CONTROL SIGNAL 109 | 1 | 0 | 0 | 1 | 1 | 0 | 0 | 1 | 1 | 0 | 1 | 0 | 1 | 0 | 1 | 1 | 0 |
| | 2 | 0 | 1 | 0 | 1 | 0 | 0 | 0 | 1 | 0 | 1 | 0 | 1 | 0 | 1 | 1 | 0 |
| | 3 | 0 | 1 | 1 | 0 | 0 | 0 | 1 | 1 | 0 | 1 | 0 | 1 | 0 | 1 | 1 | 0 |
| | 4 | 1 | 0 | 0 | 1 | 1 | 0 | 0 | 1 | 1 | 0 | 0 | 0 | 1 | 0 | 0 | 1 |
| | 5 | 1 | 0 | 1 | 0 | 1 | 0 | 1 | 0 | 1 | 0 | 1 | 0 | 1 | 0 | 1 | 0 |
| | 6 | 1 | 1 | 0 | 0 | 1 | 1 | 0 | 0 | 1 | 1 | 0 | 0 | 1 | 1 | 1 | 0 |
| (2) RECEIVING CONTROL SIGNAL 110 | 1 | 0 | 0 | 1 | 1 | 0 | 0 | 1 | 1 | 0 | 1 | 0 | 0 | 0 | 1 | 1 | 0 |
| | 2 | 0 | 1 | 0 | 1 | 0 | 0 | 0 | 1 | 0 | 1 | 0 | 1 | 0 | 1 | 1 | 0 |
| | 3 | 0 | 1 | 1 | 1 | 0 | 0 | 1 | 1 | 0 | 1 | 0 | 1 | 0 | 1 | 1 | 0 |
| | 4 | 1 | 0 | 0 | 0 | 1 | 0 | 1 | 0 | 1 | 0 | 1 | 0 | 1 | 0 | 0 | 1 |
| | 5 | 1 | 0 | 1 | 0 | 1 | 0 | 1 | 0 | 1 | 0 | 1 | 0 | 1 | 0 | 1 | 0 |
| | 6 | 1 | 1 | 0 | 0 | 1 | 1 | 0 | 0 | 1 | 1 | 1 | 0 | 1 | 1 | 0 | 0 |

FIG. 4 (b)

CHANNEL BIT GROUP NO. / STATION / TIME PATTERN

| | T0 | | | | T1 | | | | T2 | | | | T3 | | | |
|---|---|---|---|---|---|---|---|---|---|---|---|---|---|---|---|---|
| | M1 | M2 | M3 | M4 | M1 | M2 | M3 | M4 | M1 | M2 | M3 | M4 | M1 | M2 | M3 | M4 |
| 1 | 0 | 0 | 1 | 1 | 0 | 0 | 1 | 1 | 0 | 0 | 1 | 1 | 0 | 0 | 1 | 1 |
| 2 | 0 | 1 | 0 | 1 | 0 | 1 | 0 | 1 | 0 | 1 | 0 | 1 | 0 | 1 | 0 | 1 |
| 3 | 0 | 1 | 1 | 0 | 0 | 1 | 1 | 0 | 0 | 1 | 1 | 0 | 0 | 1 | 1 | 0 |
| 4 | 1 | 0 | 0 | 1 | 0 | 0 | 1 | 1 | 0 | 0 | 1 | 1 | 1 | 0 | 0 | 1 |
| 5 | 1 | 0 | 1 | 0 | 1 | 0 | 1 | 0 | 1 | 1 | 0 | 0 | 0 | 0 | 1 | 0 |
| 6 | 1 | 1 | 0 | 0 | 1 | 1 | 0 | 0 | 1 | 1 | 0 | 0 | 1 | 1 | 1 | 0 |
| 1 | 0 | 0 | 1 | 1 | 0 | 0 | 1 | 1 | 0 | 0 | 1 | 1 | 0 | 0 | 1 | 1 |
| 2 | 0 | 1 | 0 | 1 | 0 | 1 | 0 | 1 | 0 | 1 | 0 | 1 | 0 | 1 | 0 | 1 |
| 3 | 0 | 1 | 1 | 0 | 0 | 1 | 1 | 0 | 0 | 1 | 1 | 0 | 0 | 1 | 1 | 0 |
| 4 | 1 | 0 | 1 | 1 | 1 | 0 | 1 | 1 | 1 | 0 | 1 | 0 | 1 | 0 | 1 | 1 |
| 5 | 1 | 1 | 1 | 0 | 1 | 1 | 1 | 0 | 1 | 1 | 1 | 0 | 1 | 1 | 1 | 0 |
| 6 | 1 | 1 | 0 | 0 | 1 | 1 | 0 | 0 | 1 | 1 | 0 | 0 | 1 | 1 | 1 | 0 |

(1) SENDING CONTROL SIGNAL 109
(2) RECEIVING CONTROL SIGNAL 110

F : FRAME SYNC BIT (x.50)   CH : CHANNEL NO.
$D_1 \sim D_{8k-1}$ : INFORMATION BIT   MFR : MULTIFRAME
A : PASS STATUS BIT
    (NORMAL "1", ABNORMAL "0")

FIG. 7

| DATA TRANSMISSION SPEED | NO. OF BITS OF SAME BIT NO. | | |
|---|---|---|---|
| | ONE | TWO | THREE |
| TRANSMISSION SPEEDS BELOW 64 Kb/S | | | |
| 1.2 | PLURAL CHANNEL 5 | 10 | 15 |
| 2.4 | 2 | 5 | 8 |
| 4.8 | 1 | 3 | 4 |
| 9.6 | — | 1 | PLURAL CHANNEL 2 |
| 14.4 | — | 1 | 1 |
| 19.2 | — | — | 1 |

(A BIT OF CONTROL SIGNAL IS INCLUDED. FRACTIONS ARE ROUNDED OFF.)

F I G. 11
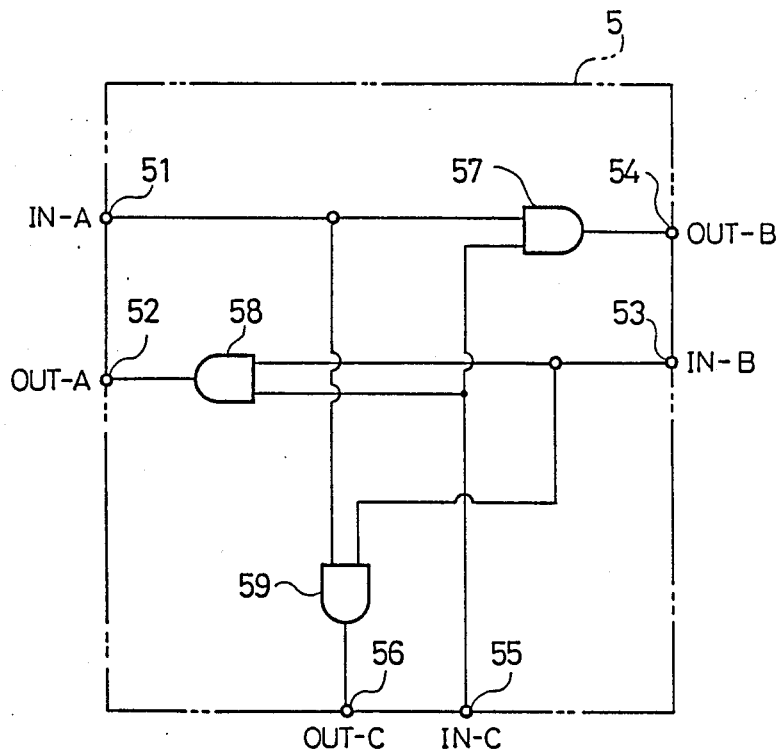

FIG. 13

| | CHANNEL BIT GROUP NO. / STATION | M1 | M2 | M3 | M4 |
|---|---|---|---|---|---|
| SENDING CONTROL SIGNAL 109 | 1 | 0 | 0 | 1 | 1 |
| | 2 | 0 | 1 | 0 | 1 |
| | 3 | 0 | 1 | 1 | 0 |
| | 4 | 1 | 0 | 0 | 1 |
| | 5 | 1 | 0 | 1 | 0 |
| | 6 | 1 | 1 | 0 | 0 |
| | | | | | |
| RECEIVING CONT- ROL SIGNAL 110 | 1 | 0 | 0 | 1 | 1 |
| | 2 | 0 | 1 | 0 | 1 |
| | 3 | 0 | 1 | 1 | 0 |
| | 4 | 1 | 0 | 0 | 1 |
| | 5 | 1 | 0 | 1 | 0 |
| | 6 | 1 | 1 | 0 | 0 |
| | | | | | |

(a) SIGNAL FRAME (b) MULTIFRAME

SF : SENDING FRAME SYNC BIT
MF : MULTIFRAME SYNC BIT
SC : SERVICE CHANNEL
MFR NO. : MULTIFRAME NO.

DIGITAL TIME DIVISION MULTIPLEX SYSTEM AND METHOD OF CONTROLLING SAME

BACKGROUND OF THE INVENTION

The present invention relates generally to digital time division multiplex systems and, more particularly, to a digital time division multiplex system useful for branching signals from one station to a plurality of stations and a method of controlling such a system.

FIG. 10 shows a conventional time division multiplexer (TDM) consisting of a multiplex control unit 100 for controlling the multiplexing of input signals from data terminal equipment (DTE), an address control memory (ACM) 104 for controlling the addresses of time slots assigned to the input signals, a line interface unit 105 for interfacing with a high-speed digital line by effecting frame formatting, frame synchronizing signal separation, synchronization establishment, and NRZ/CMI code conversion, an address bus 106 for transmitting the address signals output from the ACM 104, a sending bus 107 for transmitting the data to be sent out, a receiving bus 108 for transmitting the received data, and data terminal interface units (DTIF) 111-1 through 111-n one for each DTE.

The DTIFs 111-1 through 111-n are identical and, therefore, only the DTIF 111-1 will be described in detail. The DTIF 111-1 consists of an address decoder (AdDECOD) 112-1 for providing an output when an address signal for each time slot on the address bus 106 matches its own address, a send gate (SGATE) 113-1 and a receive gate (RGATE) 114-1, each responsive to an output from the AdDECOD 112-1 to open, a sending speed converter (SSCONV) 115-1 for converting the speed or bit rate of data from the DTE into that of the high-speed digital line, a receiving speed converter (RSCONV) 116-1 for receiving a predetermined bit group of the data received from the receiving bus 108 when the RGATE 114-1 opens and converting its bit rate into the DTE bit rate, a sending data receiving interface unit (SDRIF) 121-1 for receiving the sending date (SD) to be transmitted, etc. from the DTE, a received data sending interface unit (RDSIF) 122-1 for sending the received data (RD), etc. to the DTE. The SDRIF 121-1 and RDSIF 122-1 may be made according to the standard specifications for the V or X series.

In operation, data signals (SD, etc.) from the DTE are sequentially input to the SDRIF 121-1 in the DTIF 111-1 and then to the SSCONV 115-1 where the speed is converted to that of a high-speed digital line such as 768 Kb/s. The time slot address signals from the ACM 104 are supplied on the address bus 106 so that each of the DTIFs 111-1 through 111-n may receive them. When the address signal matches its own address, the DTIF 111-1 opens the SGATE 113-1 and the RGATE 114-1. At this point, the sending data from the SSCONV 115-1 is put on the sending bus 107 through the SGATE 113-1. The sending data on the sending bus 107 is input to the line interface unit 105 where it is converted into NRZ/CMI codes and put into a predetermined time slot or bit position of a transmission frame on the high-speed digital line. All the outputs from the DTIFs 111-1 through 111-n are sequentially put into the time slots on the sending bus 107 according to the address contents stored in the ACM 104.

On the other hand, the signals received from the high-speed digital line is converted into CMI/NRZ codes in the line interface unit 105, and the frame synchronization is separated and the synchronization is established. The received data is then put on the receiving bus 108 at the same bit rate as that of the high-speed digital line. Since the time slot of the received data and the output of the ACM 104 are synchronized, when the AdDECODE 112-1 finds its own address, the DTIF 111-1 opens RGATE 114-4 to read the received data in the time slot from the receiving bus 108 and input it to the RSCONV 116-1. The output is input to the RDIF 122-1 where it is converted into the data signal (RD, etc.) of the same bit rate as that of the DTE and output to the DTE.

Such a conventional TDM system is able to provide point-to-point services but unable to adapt itself to recent branching services. A conventional bidirectional branching system for providing branching services, and the signals to be transmitted will be described.

FIG. 11 shows a bidirectional branching unit (BU) 5 consisting of a pair of A directional lines 51 and 52, a pair of B directional lines 53 and 54, a pair of C directional lines 55 and 56, three input terminals IN-A through IN-C, three output terminals OUT-A through OUT-C, and three AND gates 57, 58, and 59. The data input at the IN-A 51 is output at the OUT-B 54 when the IN-C 55 is a logical "1" but becomes a logical "0" when the IN-C 55 is a logical "0". When an all "1" code for the channel is input at the IN-C 55, the data input at the IN-A 51 is output at the OUT-B 54 as it is. At the same time, the data input at the IN-A 51 is output at the OUT-C 56 when the IN-B 53 is a logical "1" but becomes a logical "0" when the IN-B 53 is a logical "0". When an all "1" code for the channel is input at the IN-B 53, the data input at the IN-A 51 is output at the OUT-C 56 as it is.

FIG. 12 illustrates how signals are transmitted in an exemplary system which consists of four stations M1 through M4, each having a TDM, connected via high-speed digital lines in which a couple of BUs 5 and 6 are installed. Six channels (4Cz=6) are provided to transmit signals among the stations M1 through M4. It can be seen that data A through L and an all "1" code are assigned to respective channels. That is to say, data A is assigned to a sending channel CH1 in the station M1 (TDM1) and is received by the station M2 (TDM2). Similarly, data B is assigned to the sending channel CH2 and received by the station M3 (TDM3). Similarly, data C is assigned to a sending channel CH3 and received by the station M4 (TDM4).

All "1" for setting all bits in the channel to "1" is assigned to channels CH4 through CH6 for transmission. The signal sent by the TDM1 is input to the IN-A 51 of the BU 5 and output at the OUT-B 54 via the AND gate 57 and at the OUT-C 56 via the AND gate 59. By means of the BU 5, the data A AND G, B, C, D, E, and all "1" are output in the channels CH1, CH2, CH3, CH4, CH5, and CH6 of the OUT-B 54, respectively, while the data A, B AND H, C AND I, J, K, and F AND L are output in the channels CH1, CH2, CH3, CH4, CH5, and CH6 of the OUT-C 56, respectively. The signals received in the CH1, CH4, and CH5 of the TDM2 of the station M2 are single data and correct, but the signals in the CH2, CH3, and CH6 are not correct data and neglected when received. In this way, communication is carried out among the respective stations.

FIG. 13 shows an example of the bit settings of the sending control signals 109 and the receiving control signals 110 to be transmitted over the digital line. The columns represent the stations M1 through M4 each having a TDM installed and the rows represent channel bit group Nos. of the sending control signal 109 and the receiving control signal 110.

FIGS. 14a and 14b illustrate a signal frame format and a 20-frame multiframe format, respectively. The bit rate of a digital line in the signal frame in FIG. 14a is 1.536 Mb/s so that the bit length of a frame available to users is 192 bits, in which the bit Nos. 1, 2, and 3-192 are used as a multiframe synchronizing bit (MF) and a service channel bit (SC) for sending a service signal, and data bits for sending data, respectively. The transmission speed of a bit of information in the multiframe of FIG. 14b is 400 b/s so that by using appropriate bits, it is possible to multiplex low-speed data into high-speed data for transmission.

In the conventional bit multiplex TDM, voice or data is put on the bit Nos. 2-192 of a signal frame for transmission. However, in the FIG. 14a example, the bit No. 2 is used as a service channel (SC) for transmitting information among stations. Since the transmission speed of a bit of information is 8 Kb/s, the transmission speeds of 64 Kb/s and 32 Kb/s require 8 and 4 bits, respectively. For transmission speeds lower than these, the multiframe is utilized.

Since the transmission speed of a bit of information in the multiframe is 400 b/s, data of 1.2 Kb/s is transmitted in three frames of the same bit number. For example, the data is assigned to the bit No. 5 and transmitted in the three frames MFR Nos. 1-3. Data of 2.4 Kb/s is transmitted in six frames of the same bit number. For example, the data is assigned to the bit No. 6 and transmitted in the MFR Nos. 1-6. Data of 9.6 Kb/s is transmitted in 24 frames of the same bit number. For example, the data is assigned to bit Nos. 7 and 8 and transmitted in the MFR Nos. 1-20 for the bit No. 7 and the MFR Nos. 1-4 for the bit No. 8.

Both high-speed and low-speed data may be assigned in a single frame. For example, low-speed data is assigned to the leading half of a frame and high-speed data is assigned to the tailing half of the frame.

SUMMARY OF THE INVENTION

It is an object of the invention to provide an economical time division multiplex system for branching services over high-speed digital lines.

It is another object of the invention to provide a time division multiplex control method for efficient transmission of information by adapting itself, without breaking a principle of constant speed branching in the branching unit, for the data amount of a channel which varies with the time or period of time.

It is still another object of the invention to provide a time division multiplex control method for accommodating branching services over a high-speed digital line by effecting not only efficient multiplexing of various data of different transmission speeds in a bit multiplexing system but also allocation in octet units of various lines for branching or repeating units.

According to one aspect of the invention there is provided a time division multiplex system including a same level code generator for generating a logic "1" or "0" and a sending signal switching unit for switching between an all "1" or "0" code from the same level code generator and an input data from date terminal equipment in channel bit group units to thereby accommodate branching services.

According to another aspect of the invention, the bit group number allocated to each channel is changed with time for transmission of multiplexed signals from a particular station.

According to still another aspect of the invention, a multiframe of n subframes, each employing bit multiplexing techniques, is formed by allocating each channel to a flow continuous time slots in a signal frame consisting a plurality of time slots in octet units.

Other objects, features, and advantages of the invention will be apparent from the following description when taken in conjunction with the accompanying drawings.

BRIEF DESCRIPTION OF THE DRAWINGS

FIG. 2 is a table showing an example of bit settings of the sending and receiving control signals to be transmitted by the system of FIG. 1;

FIG. 7 shows the number of available channels depending on the number of same bits assigned;

FIG. 11 is a block diagram of a bidirectional branching unit;

FIG. 13 is a table showing bit settings of the sending and receiving control signals of the conventional system.

DESCRIPTION OF THE PREFERRED EMBODIMENTS

Figure 1:
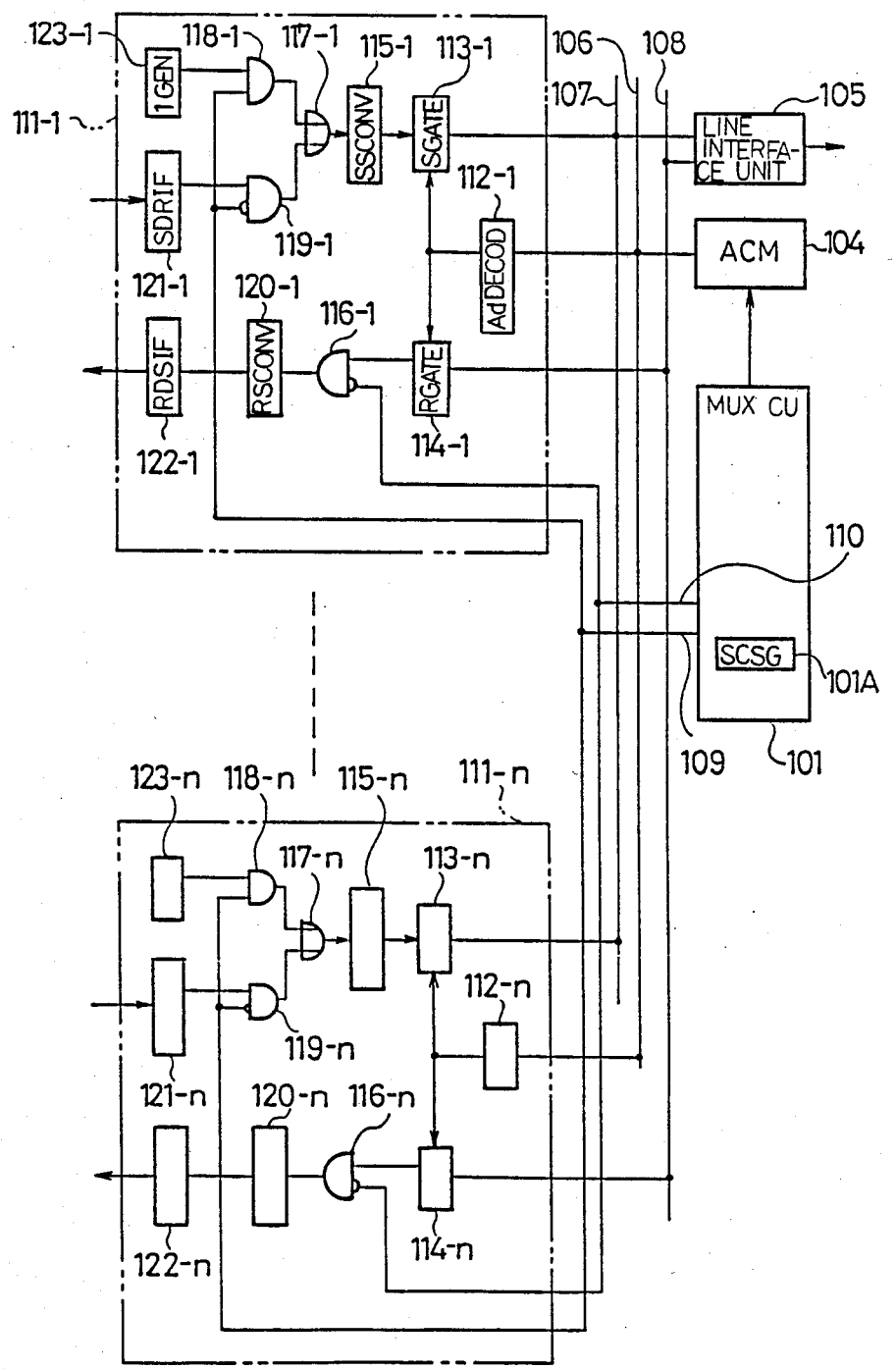
FIG. 1 is a block diagram of a TDM system according to an embodiment of the invention.
Figure 10:
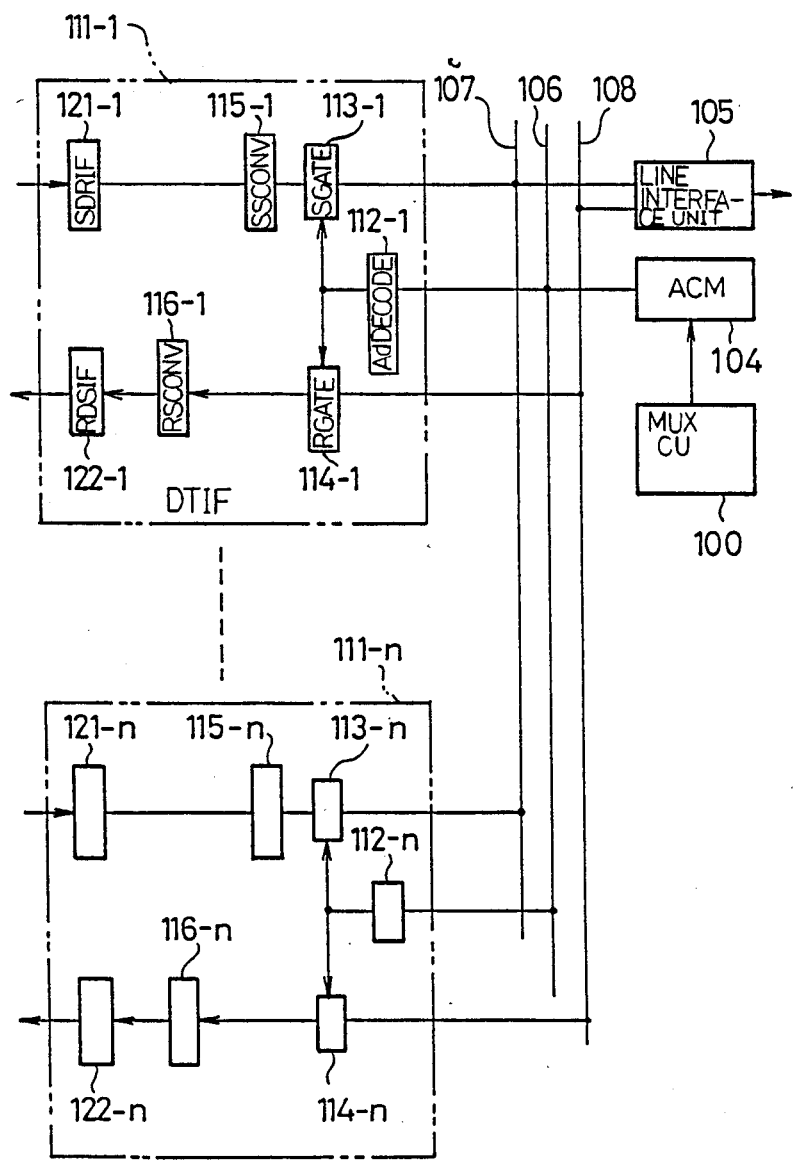
FIG. 10 is a block diagram of a conventional TDM system.
Figure 12:
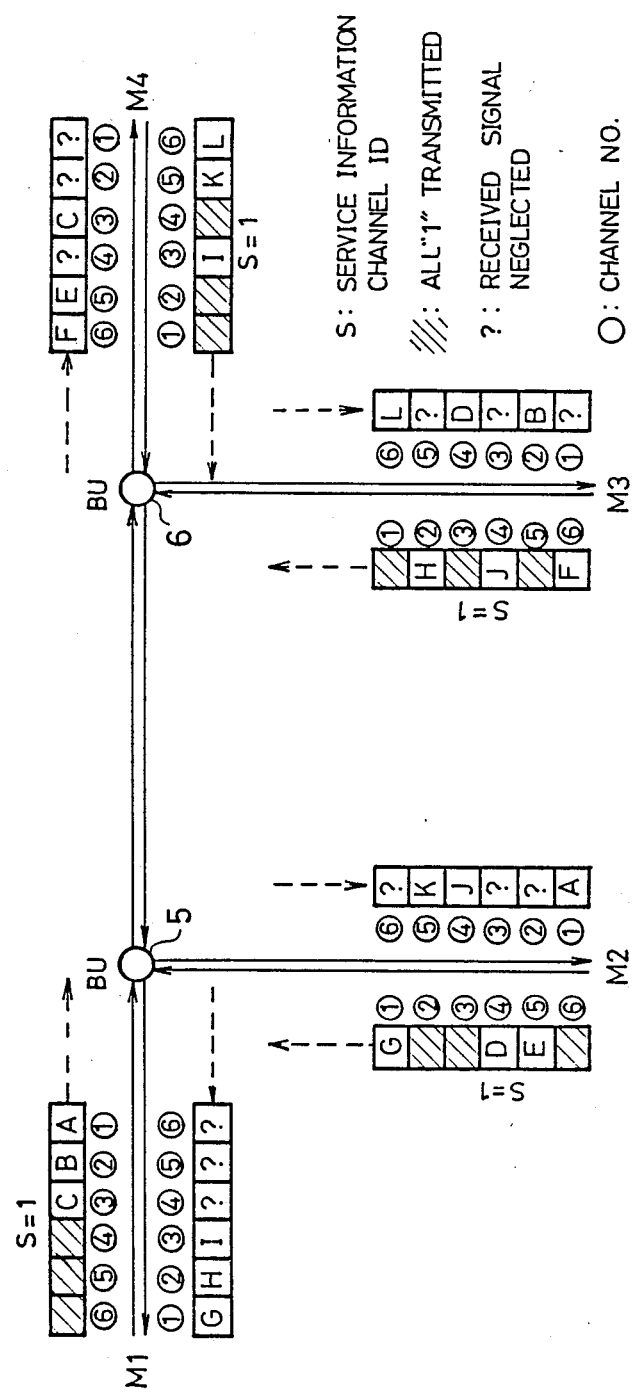
FIG. 12 illustrates a branching transmission system using the branching unit of FIG. 11.
Figure 14:
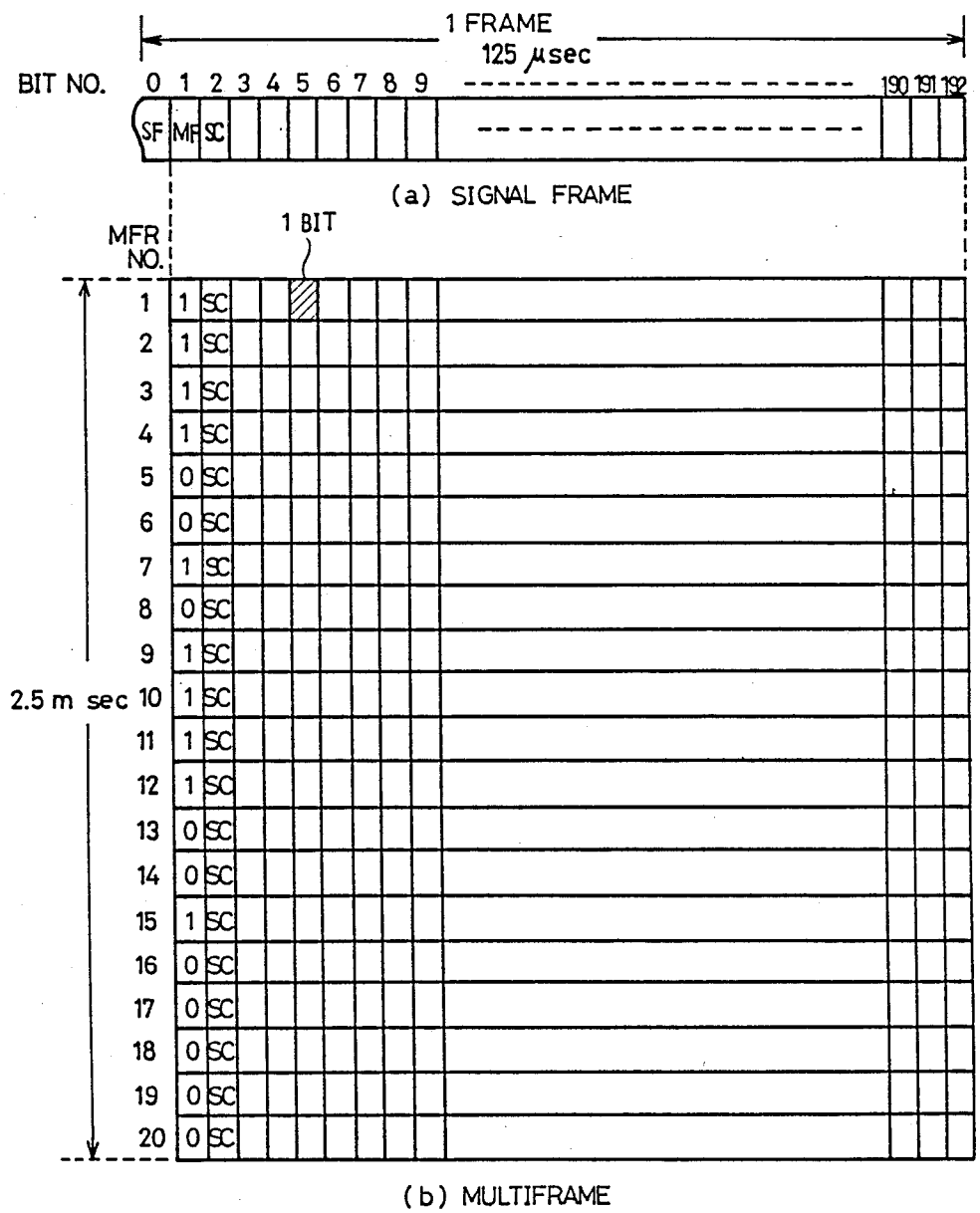
FIG. 14 shows signal frame and multiframe formats of the conventional TDM system.

FIG. 1 shows a TDM system which includes a multiplex control unit 101 for not only controlling the bit-by-bit multiplexing/demultiplexing of data from the DTE or signals from a high-speed digital line but also sequentially transmitting a receiving control signal 110 and a sending control signal 109 to a bank of DTIFs 111-1 through 111-n to thereby control a sending signal switching circuit, which is to be described below, according to a predetermined channel bit group of information. Other elements 104 through 108 are identical with those of FIG. 10 and will not described in detail.

All of DTIFs 111-1 through 111-n are identical and only the DTIF 111-1 will be described. The DTIF 111-1 consists of an AdDECOD 112-1, an SGATE 113-1, a RGATE 114-1, an SSCONV 115-1, a RSCONV 120-1, an SDRIF 121-1, and a RDSIF 122-1, which are all identical with those of FIG. 10, and a NAND gate 116-1 forming a receiving control gate, and a sending signal switching circuit consisting of an OR gate 117-1, and AND gate 118-1, and a NAND gate 119-1, which are provided for purposes of easier understanding of the functions of the sending signal switching circuit. The sending signal switching circuit also has an all "1" code generator 123-1 which is a circuit for generating codes of the same level.

The multiplex control unit 101 has a sending control signal generator 101A which generates a sending control signal for controlling the NAND gates 116 and 119, and the AND gate 118.

FIG. 2 shows an example of bit settings of the sending control signal 109 and receiving control signal 110. The details will be described later herein.

How signals are transmitted by respective stations according to those settings of the sending control signal 109 and receiving control signal 110 are illustrated in FIGS. 5a-5d. In this example, six channels are necessary for signal transmission among four stations M1 through M4 so that a frame of 96 bits at a bit rate of 768 Kb/s is divided into six 16-bit or 2-octet channel bit groups. Each bit group is labeled with a letter A through L and, in a bit group, the bit multiplexing is employed. For example, in the bit group A, M1→M4, in the bit group B, M1→M3, in the bit group C, M1→M4, and in the bit group D, M2→M3, and so on.

In operation, the multiplex control unit 101 sequentially transmits a sending control signal 109 and a receiving control signal 110 to the DTIFs 111-1 through 111-n according to a predetermined channel bit group of information. As shown in FIG. 2, each station transmits a logical "0" or "1" for each bit group or channel. The sending control signal 109 is set to a logical "0" to send data in the bit group and to a logical "1" to send an all "1" code while the receiving control signal 110 is set to a logical "0" to input the received signal to the RSCONV 120-1 through 120-n and to a logical "1" to inhibit the input. These sending and receiving control signals are supplied to all the DTIFs 111-1 through 111-n.

The data signal from the DTE is sent to the SDRIF 121-1 and then the NAND gate 119-1. When the AdDECOD 112-1 finds its own address on the address bus 106, the SGATE 113-1 and RGATE 114-1 open. When the sending control signal 109 is a logical "0", the NAND gate 119-1 opens to pass the data signal from the SDRIF 121-1 to the SSCONV 115-1 via the OR gate 117-1. The bit rate is converted and the data signal is output on the sending bus 107 in the allotted time slot. The subsequent operation is identical with that of the conventional system and the description will be omitted.

When the sending control signal 109 is a logical "1", the AND gate 118-1 opens so that an output from the all "1" code generator 123-1, which renders a bit in the time slot to a logical "1", is input to the SSCONV 115-1 for transmission of a logical "1". The AdDECODs 112-1 through 112-n sequentially open while the DTIFs 111-1 through 111-n in the same channel bit group transmit a logical "1" as long as the sending control signal is a logical "1". Thus, an all "1" code is formed and transmitted.

The received signal on the receiving bus 108 is input to the NAND gate 116-1 via the RGATE 114-1. When the receiving control signal 110 is a logical "0", the NAND gate 116-1 opens to input the received signal to the RSCONV 120-1 so that the RDSIF 122-1 transmits the data signal to the DTE. When the receiving control signal 110 is a logical "1", the NAND gate 116-1 does not open, effecting no receiving; i.e., any reception is neglected.

The branching unit in this embodiment is composed of only AND gates so that an all "1" code is used for the equal level code generator. If an all "0" code is used, of course, the all "1" code generator is replaced by an all "0" code generator.

Figure 3:
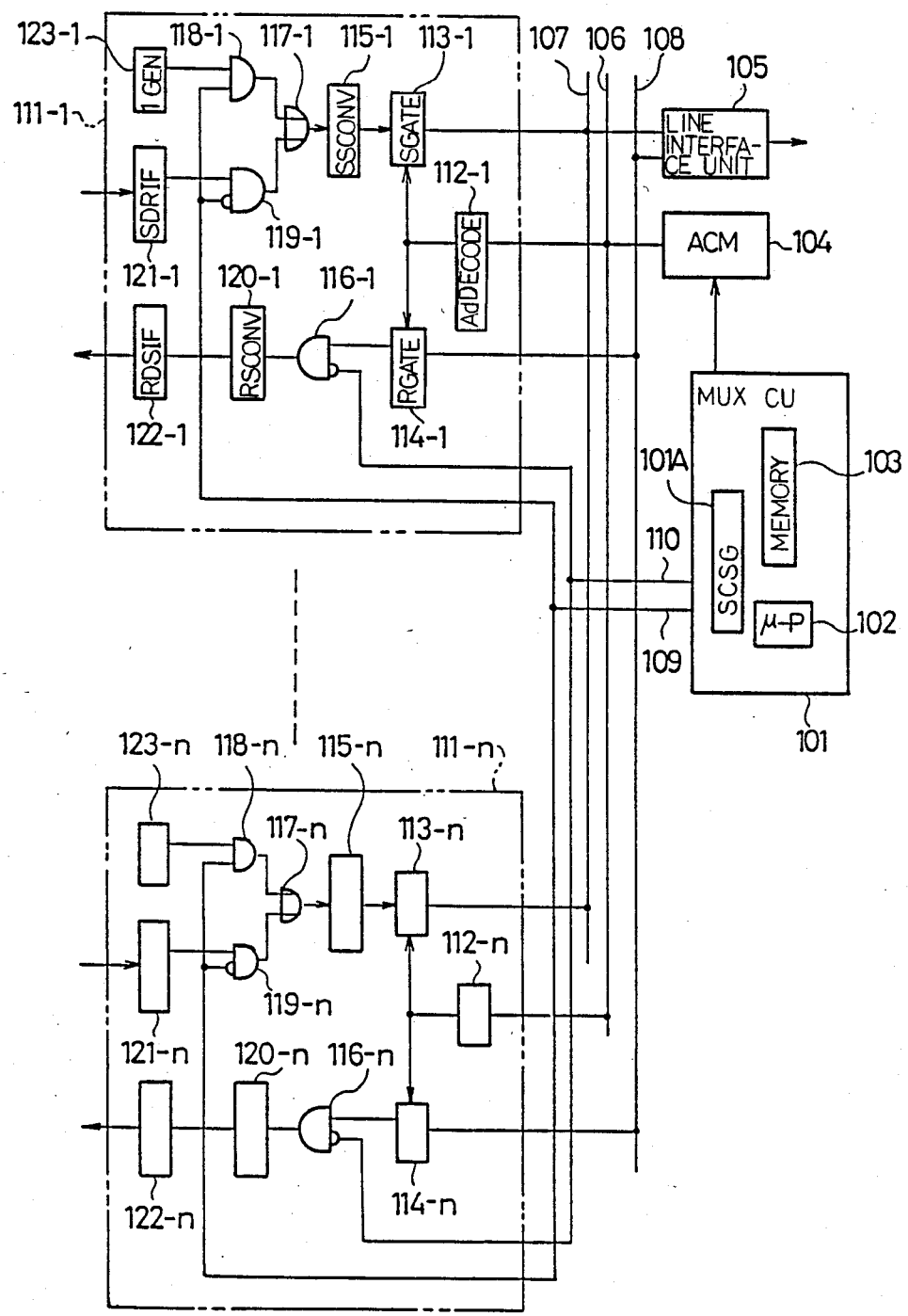
FIG. 3 is a block diagram of a TDM system according to another embodiment of the invention.

FIG. 3 shows another embodiment of the invention. Unlike the above embodiment, the multiplex control unit 101 of this embodiment further includes a memory 103 and a microprocessor 102 capable of setting the sending control signal 109 and the receiving control signal 110 for each station at each time and easily changing the settings.

FIGS. 4a-4d illustrate setting patterns of the sending control signal 109 and the receiving control signal 110 for each station at each time pattern, in which T0-T3 are setting time patterns and (1) and (2) are output settings of the sending control signal 109 and the receiving control signal 110, respectively. T0 is a condition under which data signal transmission is always possible among the respective stations.

FIG. 4a shows a time pattern in which all channel bit groups between the master station M1 and the slave stations M2-M4 are assigned to a particular slave station, from which data are collected. The particular slave station is changed with time so that data are collected sequentially from all the slave stations.

In FIG. 4b, all the channel bit groups among the slave stations are assigned to a particular slave station, from which data are collected. The particular slave station is changed with time so that data are collected sequentially from all the slave stations.

Figure 4C:
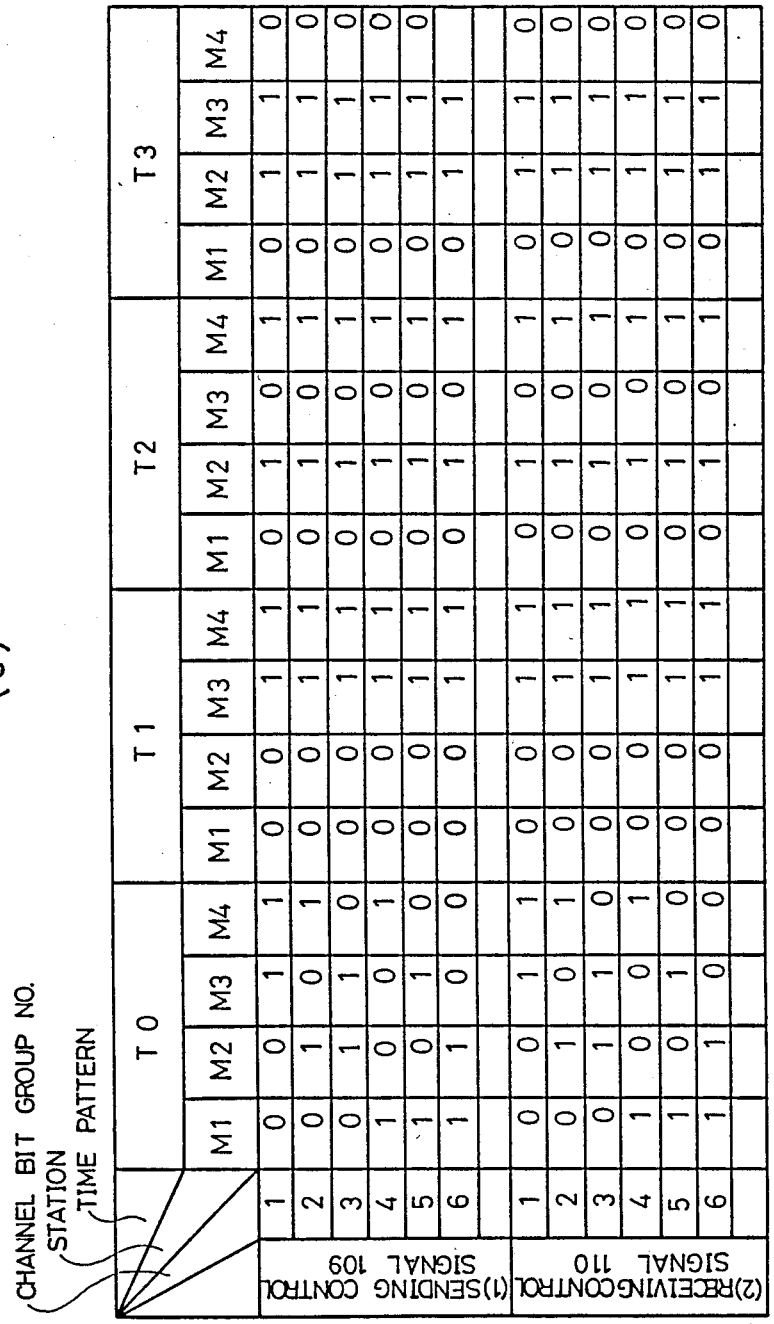
FIGS. 4a through 4d are tables each showing an example of bit settings of the sending and receiving control signals to be transmitted by the system of FIG. 3.
Figure 4:
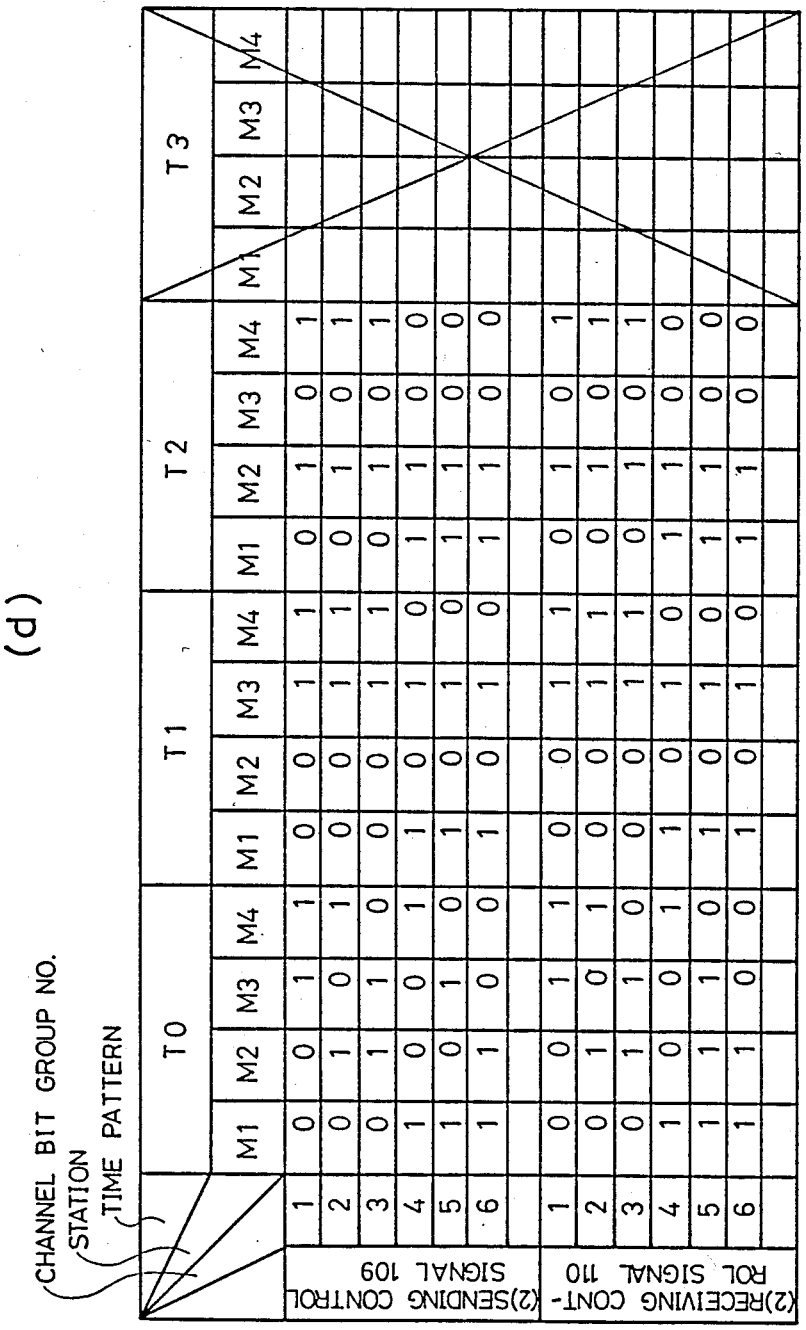

In FIG. 4c, all the channel bit groups between the master station and the slave station and among the slave stations are assigned to a particular slave station, from which data are collected. The particular slave station is changed with time so that data are collected sequentially from all the slave stations.

In FIG. 4d, all the channel bit groups between the master station and the slave station and among the slave stations are assigned to between a particular slave station and a plurality of master stations so that the master stations collect data from the particular slave station. At the same time, the particular slave station is changed with time so that the master stations collect data sequentially from all the slave stations.

FIGS. 5a-5d illustrate signals of the time pattern T1 transmitted among the respective stations, with the sending control signal 109 and the receiving control signal 110 set as shown in FIGS. 4a-4d.

The operations of the respective units of FIG. 3 are the same as those of FIG. 1. The output settings of the sending control signal 109 and the receiving control signal 110 as shown in FIGS. 4a-4d are stored in the memory 103 of the multiplex control unit 101 in each TDM 1-4 of station M1-M4. The microprocessor 102 controls the memory 103 to provide an output at a time according to each setting table. This allows transmission signals to be processed according to each time pattern as shown in FIGS. 5a-5d. This is to say, the time pattern T1 of FIG. 4a allows the signal transmission of FIG. 5a, the time pattern T1 of FIG. 4b allows the signal transmission of FIG. 5b, and the time pattern T1 of FIG. 4c allows the signal transmission of FIG. 5c, and so on. In terms of the number of channel bit groups in the case of M2→M1, the bit group (1)(G) at a time pattern T0 in the station M2 is increased to three bit groups (1)(G), (2)(H), and (3)(I) in FIG. 5a, two bit groups (1)(G) and (4)(J) in FIG. 5b, and six bit groups (1)(G) through (6)(L) in FIG. 5c.

Figure 5A:
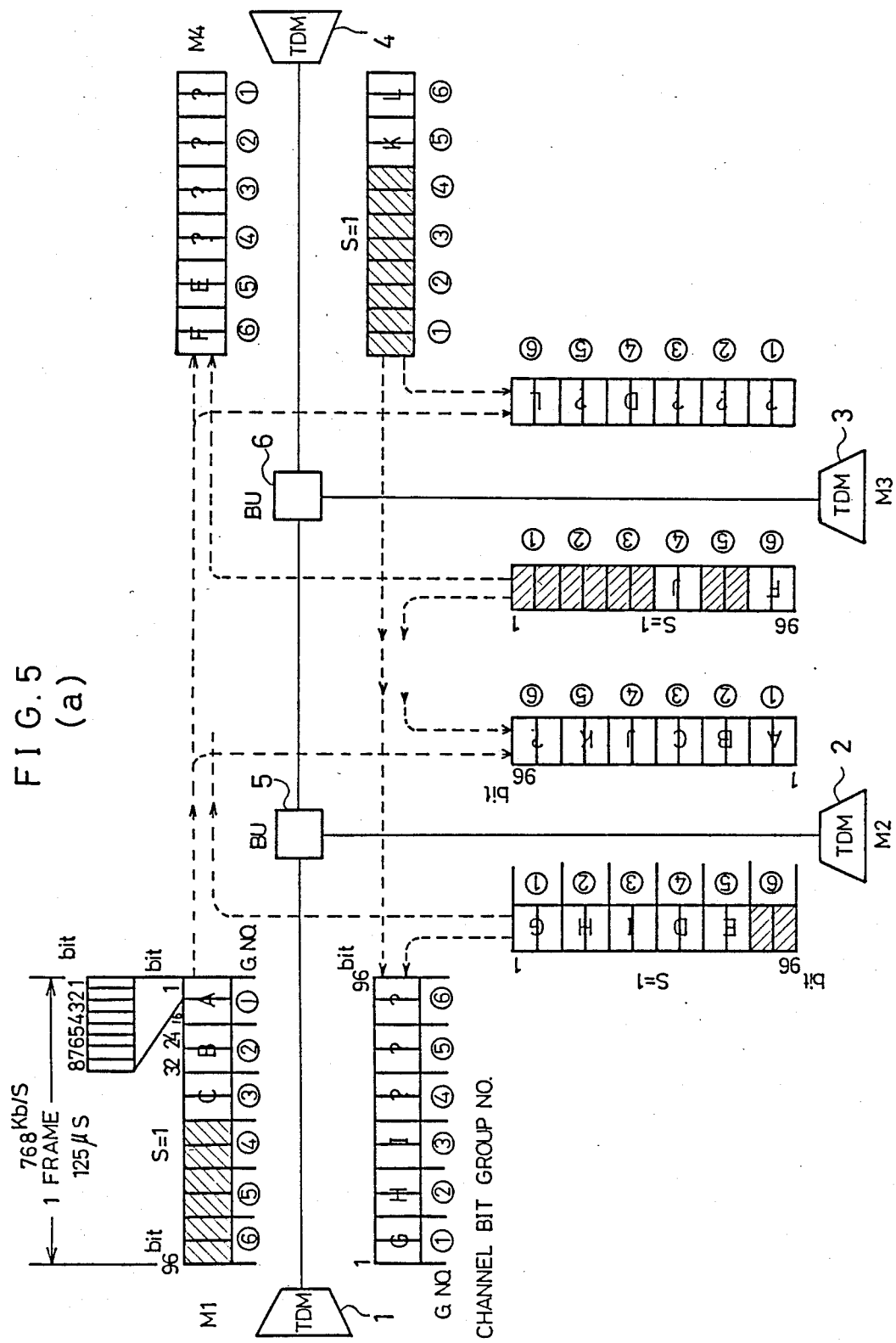
FIGS. 5a through 5d shows the allocation of channel bit groups and the transmission signals relative to FIGS. 4a through 4d.
Figure 5B:
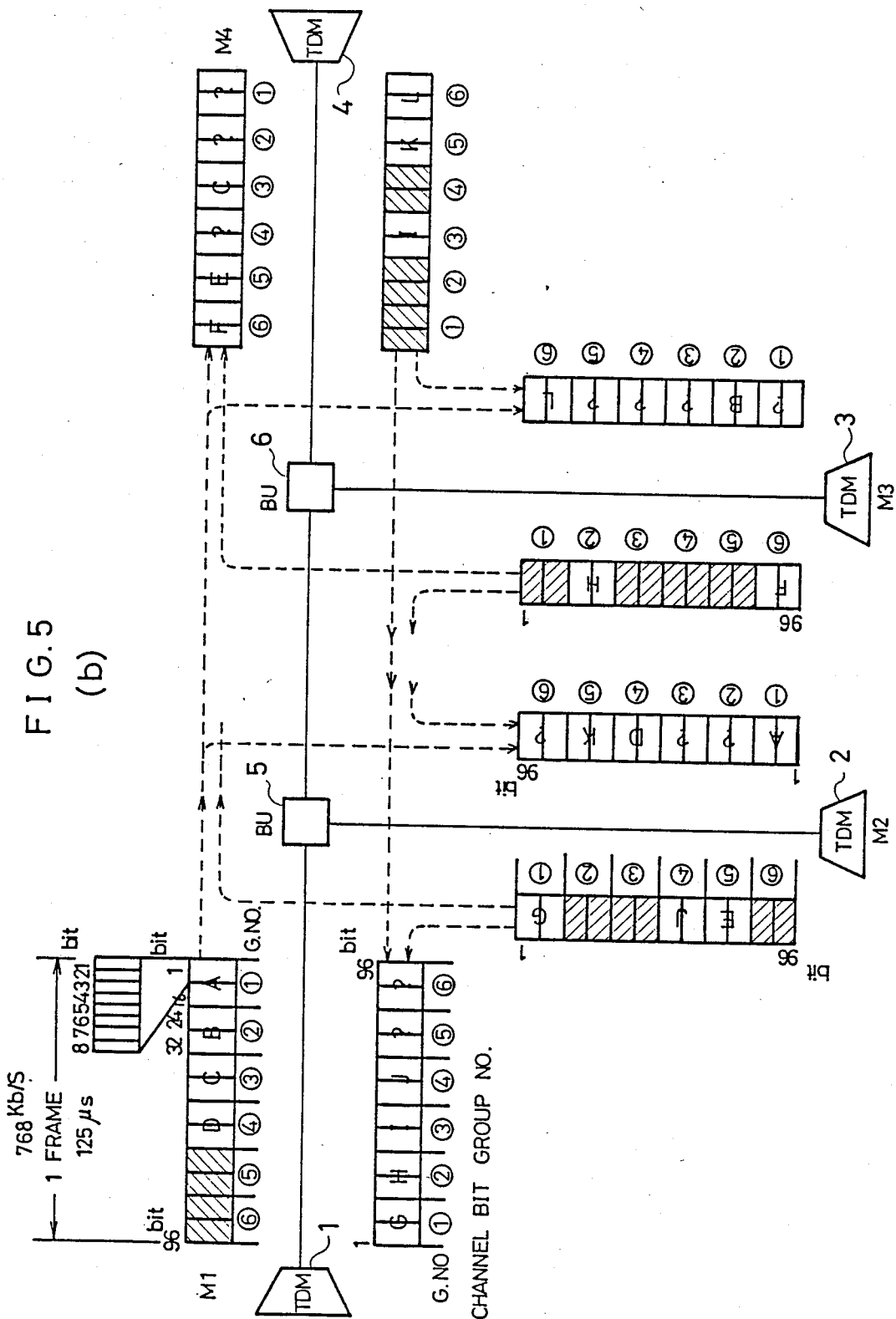
Figure 5C:
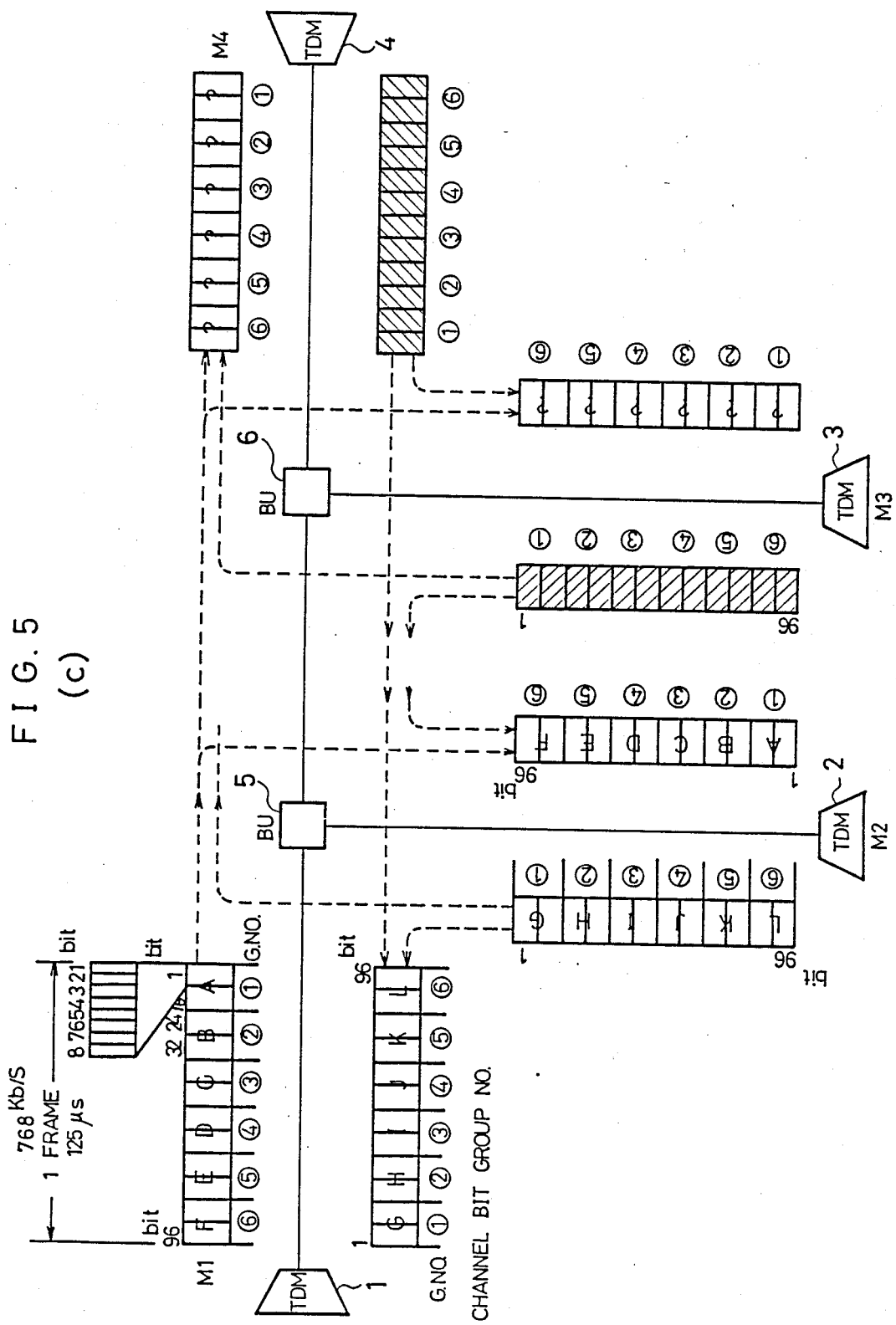
Figure 5D:
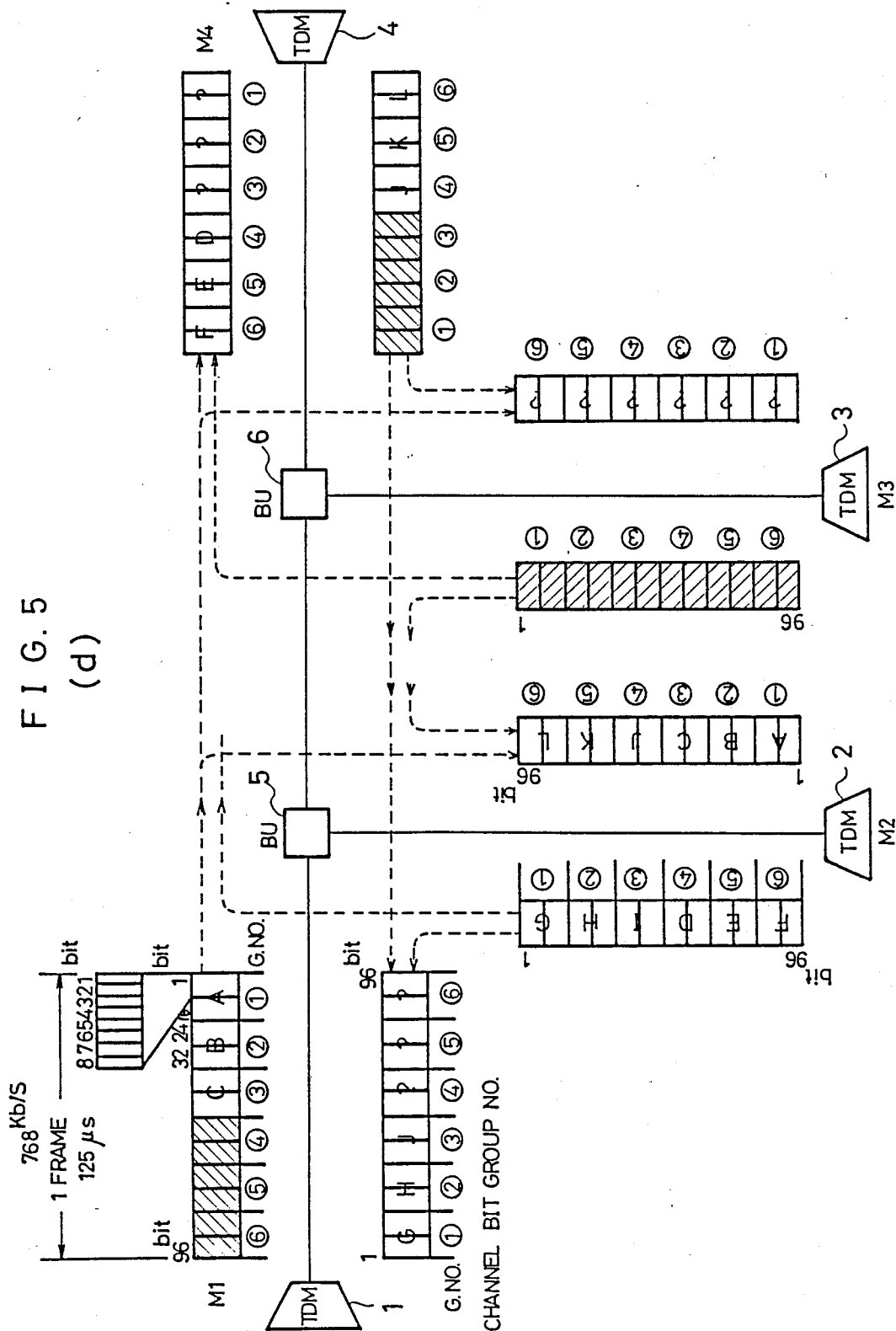

FIG. 5d shows that at time T1 the station M2 is allowed to use three bit groups for each of two master stations M1 and M4. Although this is for the time setting pattern T1, the same rules apply to the time setting patterns T2 and T3, respectively.

Figure 6:
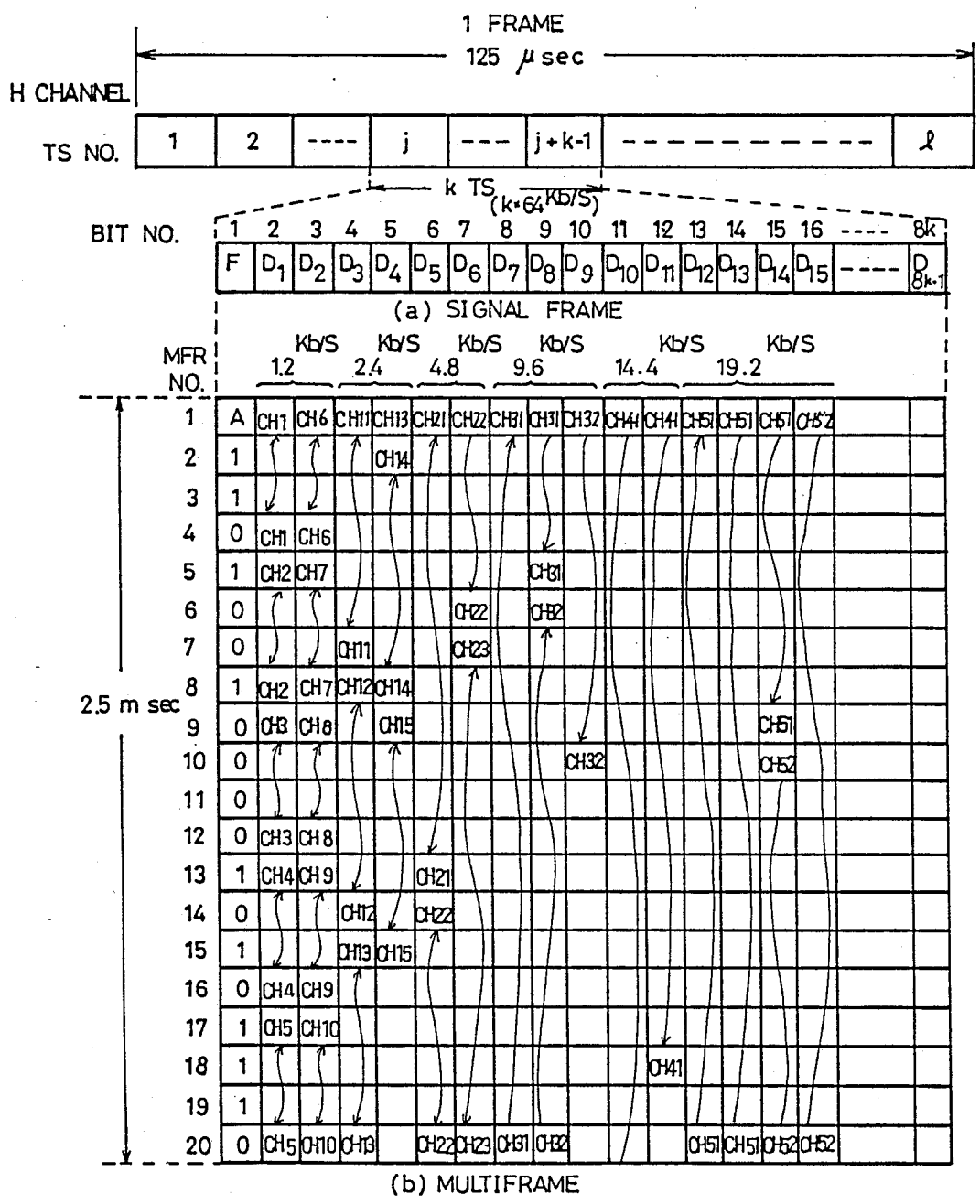
FIG. 6 shows a 400 b/s signal frame format according to an embodiment of the invention.

FIG. 6 shows a 400 b/s signal frame format; more specifically, FIG. 6a shows a signal frame on a high-speed digital line and FIG. 6b illustrates a multiframe consisting of 20 frames MFR Nos. 1-20. In FIG. 6a, time slots (TS) are defined in octet units. k continuous time slot kTS (k×64 Kb/s) from j to (j+k−1) in a frame length 1TS is allotted to a channel indicating that a sequence of bits 1-8k is processed without octet division in this subframe kTS. j, k, and 1 are integers. When the bit rate of a high-speed digital line is 1.536 Mb/s, 1 is 24. Thus, if the bit rate of information branched to a certain channel is 192 Kb/s, then k=3. Also, 1 is 96 for 6.144 Mb/s. F of the subframe is a frame synchronizing bit and constitutes, for example, the CCITT recommendation X,50 synchronizing pattern. This synchronizing pattern may be another sequence of codes. D1–D8k−1 are data bits for transmission of data or control signals.

The multiframe of FIG. 6b is composed of 20 subframes. Bit No. 1 is an F bit forming the above synchronizing pattern. Bit Nos. 2–8k is subframes MFR Nos. 1-20 are used to form channels (CH). A at bit No. 1, MFR No. 1, is a pass monitoring bit and transmits normal "1" and abnormal "0" according to the CCITT recommendation.

FIG. 7 shows the number of channels available at various data transmission speeds depending on the number of bits at the same bit No. in subframes of the multi-frame format of FIG. 6b. It means that a plurality of channels may be formed with bits of the same bit No. at bit rates of 1.2 Kb/s, 2.4 Kb/s, etc. below 64 Kb/s.

Figure 8:
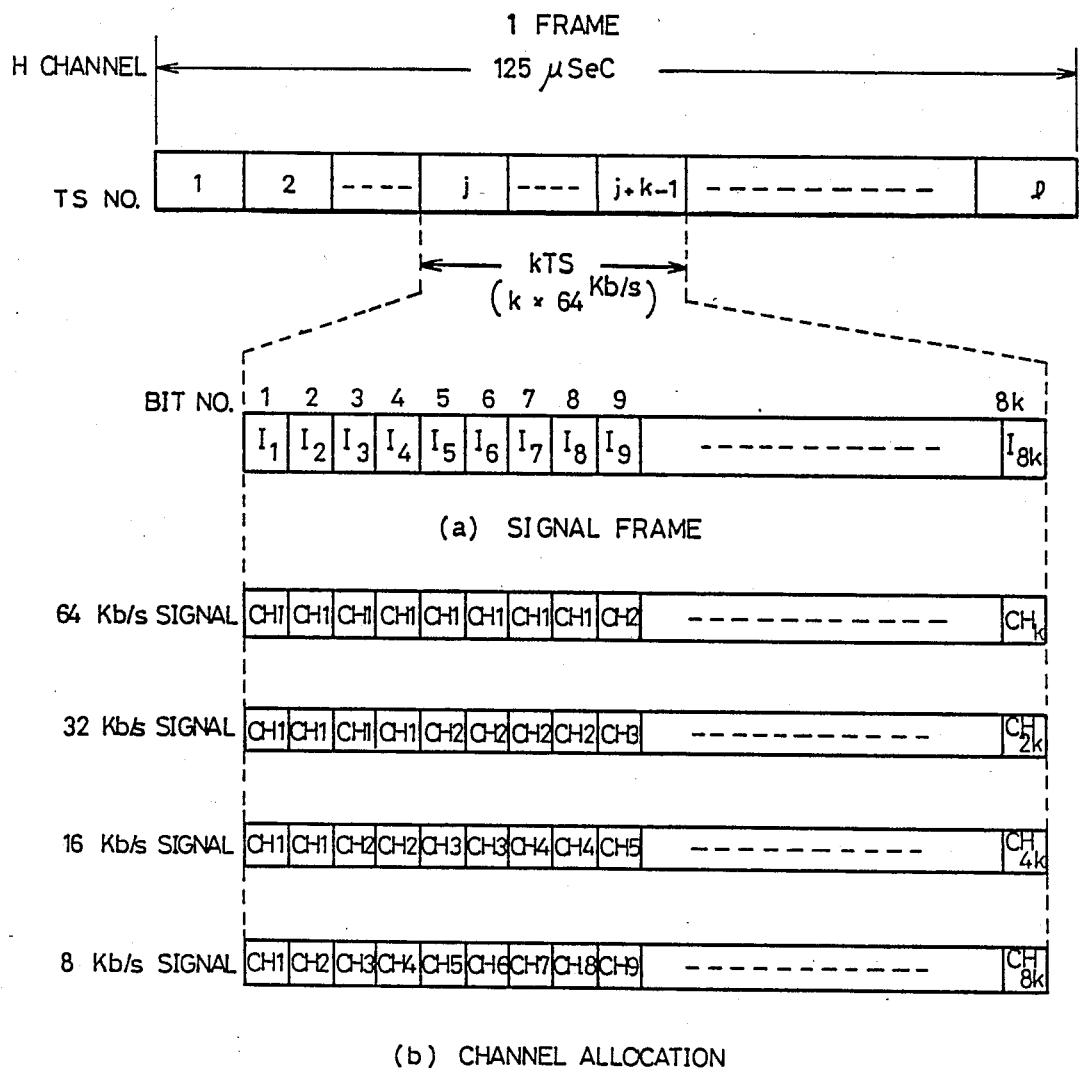
FIG. 8 shows an 8 Kb/s signal frame format.

FIG. 8 shows an 8 Kb/s signal frame format; FIG. 8a is a signal frame on a high-speed digital line and FIG. 8b illustrates channel allocation for signal transmission at bit rates of 8 kb/s, 16 Kb/s, 32 Kb/s, and 64 Kb/s. Like reference numerals indicate the same elements as those of FIG. 6. I1–I8k are information bits.

When the transmission speed of data signals is 1.2 Kb/s or its multiples (q times), the data is stored along with the ancillary control signal which has multipoint sampled at 400 b/s.

FIG. 6 shows how a plurality of data terminal lines at bit rates of 1.2 Kb/s to 19.2 Kb/s are allotted in a multi-frame. For the 400 b/s signals, channels are made in bit rate units of (q×1.2 Kb/s+m×400 b/s) where m is the number of control signals, and allotted in the above multiframe from the beginning.

If q=1 and m=1, then the bit rate is 1.6 Kb/s, thus requiring 4 bits in the multiframe. Consequently, for 10 data terminal lines at 1.2 Kb/s, bit No. 2 accommodates CH1–CH5 and bit No. 3 accommodates CH6–CH10 including control signals. Similarly, if q=2 and m=1, then the bit rate is 2.8 Kb/s, requiring 7 bits in the multi-frame. Consequently, for five data terminal lines of 2.4 Kb/s, bit No. 4 accommodates CH11 through part of CH13 and bit No. 5 accommodates the rest of CH13 through CH15 including control signals. Similarly, if q=4 and m=1, then the bit rate is 5.2 Kb/s, requiring 13 bits in the multiframe. Consequently, for three data items of 4.8 Kb/s, CH21, CH22, and CH23 are allocated to bit No. 6, bit No. 6 and part of bit No. 7, and the rest of bit No. 7, respectively. The channel numbers are given on the basis of data bit rates and not continuous from CH1. At q=8 and m=1, the bit rate is 10.2 Kb/s, and CH31 and CH32 are allotted to bit No. 8 and part of bit No. 9, and the rest of bit No. 9 and bit No. 10, respectively. When the bit rate is 14.4 or 19.2 Kb/s, plural bits in a subframe are distributed in the multiframe for allocation. An example of the number of channels available in a multiframe consisting of 20 subframes is shown in FIG. 7.

For bits Nos. higher than bit No. 16, no illustration is provided but it is apparent that the multiframe is used in the same way or plural bits in a subframe are used to transmit high-speed data signals of 8, 16, 32, or 64 Kb/s.

In the multiframe format of FIG. 6b, CH32 is allocated to the bit No. 10 while the MFR Nos. 11-20 are blank, to which data channels of other bit rates may be allocated for achieving higher efficiency. For example, the allocation of data channels of 2.4 Kb/s increase the multiplexing efficiency.

Figure 9:
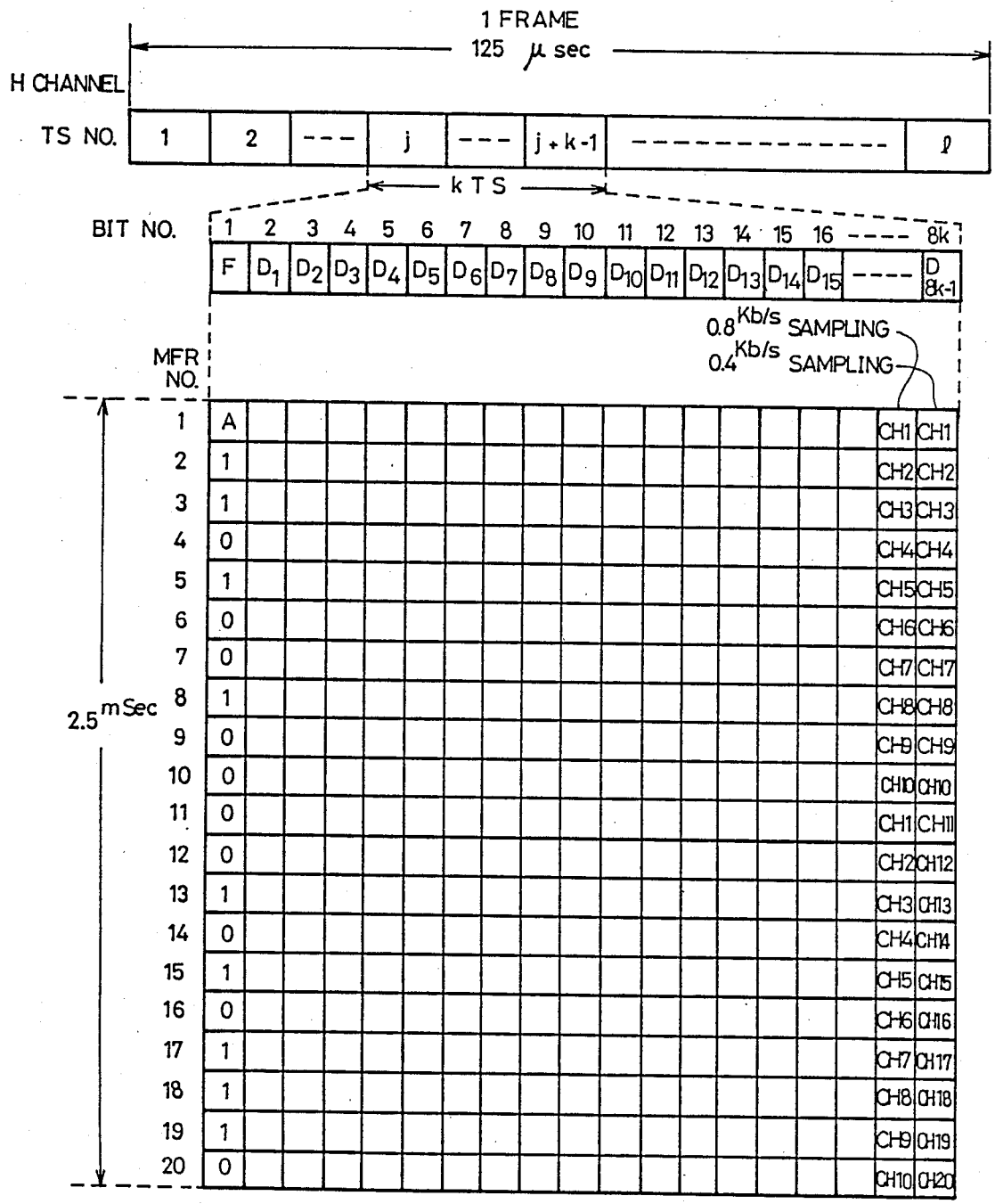
FIG. 9 illustrates a signaling frame format.

FIG. 9 shows the frame format of a telephone signaling signal. Signaling is accomplished by allocating data, which has been multipoint sampled at multiples of 400 b/s (400 and 800 b/s in this example) for each channel, to a single bit No. in the multiframe for transmission. For the transmission of a signaling signal, the same multiframe synchronizing pattern as that of FIG. 6 is used. However, the synchronizing pattern may be another sequence of bits. Data of no more than 64 Kb/s, signals of 8 Kb/s, and signaling signals may be multiplexed in a single subframe. When no branching services are required, the multiframe synchronizing bit of a plurality of subframes may be allocated to a single subframe and other subframes are processed in the same multiframe phase, thus eliminating the need for the other multiframe synchronizing bits.

The number of subframes constituting a multiframe has been 20 in the above embodiment but, of course, it is not limited to this number. Where signals of low speed are transmitted, more than 20 frames, for example, 80 frames may be used to form a multiframe. In such a case, the minimum multiplexing speed is 100 b/s. Of course, the present invention is applicable to digital lines of higher speeds such as 2.048 or 8.192 Mb/s or even 32 Mb/s.

While a preferred embodiment of the invention has been described using specific terms, such description is for illustrative purposes only, and it is to be understood that changes and variations may be made without departing from the spirit and scope of the appended claims.

What is claimed is:

1. A digital time division multiplex system for effecting time division multiplexing of signals in channel bit group units equal in number to combinations of channels, which comprises:
   a plurality of data terminal interface units each including sending and receiving data transmission speed converters for converting data transmission speeds of sending and received data between a first data transmission speed and a data transmission speed of a high speed digital line, send and receive gates for controlling flows of data;
   a multiplex control unit for controlling said data terminal interface units to thereby control signal transmission between data terminal equipment and said high-speed digital line;

said data terminal interface units each further including a predetermined level code generator for generating a signal of a predetermined level; and a sending signal switching unit, having a control input, for switching between said predetermined level signal and a signal from said data terminal equipment, in response to a sending control signal, to provide an output to said send date; and said multiplex control unit further including a sending control signal generator, having an output coupled to said control input, for generating a sending control signal for controlling switching functions of said sending signal switching unit.

2. The digital time division multiplex system of claim 1, wherein said predetermined level code generator is an all "1" code generator for generating a logical "1" as said predetermined level.

3. The digital time division multiplex system of claim 1, wherein said predetermined level code generator is an all "0" code generator for generating a logical "0" as said predetermined level.

4. The digital time division multiplex system of claim 1, wherein said sending signal switching unit is controlled in each channel bit group unit of a signal transmitted by said data terminal equipment.

5. A digital time division multiplex system for effecting time division multiplexing of signals in channel bit group units equal in number to combinations of channels, which comprises:

a plurality of data terminal interface units each including sending and receiving data transmission converters for converting data transmission speeds of sending and receiving data between a first data transmission speed and a data transmission speed of a high-speed digital line, send and receive gates for controlling flows of data;

a multiplex control unit for controlling said data terminal interface units to thereby control signal transmission between data terminal equipment and a high-speed digital line;

said data terminal interface units each further including a predetermined level code generator for generating a signal of a predetermined level; and a sending signal switching unit, having a control input, for switching between said predetermined level signal and a signal from said data terminal equipment, in response to a sending control signal, to provide an output to said send gate; and said multiplex control unit further including a sending control signal generator, having an output coupled to said control input, for generating a sending control signal for controlling switching functions of said sending signal switching unit;

a memory for recording in each time unit timing information of said sending control signal generated by said sending control signal generator; and a microprocessor responsive to said timing information from said memory to change with time timing of generation of said sending control signal for concentrating information in channel bit group units on a particular station.

6. The digital time division multiplex system of claim 5, wherein said predetermined level code generator is an all "1" code generator for generating a logical "1" as said predetermined level.

7. The digital time division multiplex system of claim 5, wherein said predetermined level code generator is an all "0" code generator for generating a logical "0" as said predetermined level.

8. The digital time division multiplex system of claim 5, wherein said sending signal switching unit is controlled for each channel bit group unit of a signal transmitted by said data terminal equipment.

9. A digital time division multiplex control method which comprises the steps of:

making a multiframe of n subframes each composed of k continuous time slots of a signal frame consisting of a plurality of time slots in 64 Kb/s octet units, each subframe being bit multiplexed and allotted to each destination, at least one bit of each subframe being used for frame phase synchronization; and making a first channel with at least one bit of at least one bit number in at least one bit of at least one bit number in at least one subframe at transmission speeds below 64 Kb/s and a second channel with a plurality of time slots at transmission speeds of or above 64 Kb/s, wherein n is a natural number and k is a natural number equal to or less than a total number of channels.

10. The digital time division multiplex control method of claim 9, which further comprises the step of allocating channels for other data to a blank in said time slots or bits of the same bit number so as to allow presence of channels of different transmission speeds in said time slots or bits of the same bit number.

11. The digital time division multiplex control method of claim 9 or 10, which further comprises the step of processing m ancillary signals, such as control signals between terminals, along with a main signal of a speed equal to $P \times 8/n$ Kb/s as a single channel $(P \times 8/n + m \times 8/n$ Kb/s) for multiplexing at transmission speeds below 64 Kb/s, wherein m and P are natural numbers and $8/n$ is a bit speed unit for a subframe.

12. The digital time division multiplex control method of claim 9, which further comprises the steps of:

multipoint sampling a telephone signaling signal in each telephone channel; and transmitting it with bits in subframes of a multiframe format.

13. The digital time division multiplex control method claim 9 or 10, which further comprises the step of including all control signals necessary for transmission of data in addition to the data itself in a channel made in said multiframe, wherein n is 20 and a bit transmission speed of said subframe is 0.4 Kb/s.

14. In a digital time division multiplexing system of the type that includes a signal frame consisting of a fixed number of octet time slots transmitted at a first high-speed bit transmission rate, a method for forming a channel having transmission rates lower than the first high-speed transmission rate, said method comprising the steps of:

forming a subframe of a given number of continuous time slots of said frame; and bit multiplexing said subframe so that a channel transmission rate of said subframe is less than the first high-speed transmission rate and is equal to product of the first high-speed transmission rate and the ratio of said given number to the fixed number.

15. The method of claim 14 further comprising the steps of:

forming a multiframe of the subframe formed in a second given number of successively transmitted signal frames, with a multiframe single-bit transmission rate of a bit position of a given subframe in the multiframe equal to the ratio of the first high-speed transmission rate to the product of the second given number and eight times the fixed number;

bit multiplexing a given bit position of a third given number of successive subframes in said multiframe so that a channel multiframe transmission rate of the given bit positions in the third given number of successive subframes is equal to the product of said multiframe single-bit transmission rate and the third given number.

16. The method of claim 15 further comprising:

bit multiplexing said third given number of data bits and a fourth given number of control bits to said given bit position in a fifth given number, equal to the sum of said third and fourth given numbers, of successive subframes to obtain a channel data transmission rate equal to the product of said multiframe single-bit transmission rate and said third given number.

17. In a digital time division multiplexing system of the type that includes a signal frame consisting of a fixed number of octet time slots transmitted at a first high-speed bit transmission rate, a method for forming a selected number of channels having transmission rates lower than the first high-speed transmission rate, said method comprising the steps of:

forming a subframe of a given number of continuous time slots of said frame; and bit multiplexing data between the selected number of channels and said subframe so that the transmission rate of said subframe for each channel is equal to the product of the ratio of the first high-speed transmission rate to the fixed number and the ratio of said given number to said selected number.

* * * * *